United States Patent
Agarwal et al.

(10) Patent No.: US 8,078,611 B2
(45) Date of Patent: Dec. 13, 2011

(54) QUERY MODES FOR TRANSLATION-ENABLED XML DOCUMENTS

(75) Inventors: Nipun Agarwal, Santa Clara, CA (US); Sanket Malde, San Carlos, CA (US); Bhushan Khaladkar, Mountain View, CA (US); Ravi Murthy, Fremont, CA (US); Sivasankaran Chandrasekar, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 736 days.

(21) Appl. No.: 11/648,950

(22) Filed: Jan. 3, 2007

(65) Prior Publication Data
US 2008/0162442 A1    Jul. 3, 2008

(51) Int. Cl.
    *G06F 17/30*    (2006.01)
(52) U.S. Cl. ........................................ 707/719; 707/720
(58) Field of Classification Search .................. None
    See application file for complete search history.

(56) References Cited

U.S. PATENT DOCUMENTS

| | | | |
|---|---|---|---|
| 6,644,322 B2 | 11/2003 | Webb | |
| 7,627,865 B2 | 12/2009 | Muhlestein et al. | |
| 7,630,974 B2 | 12/2009 | Remahl et al. | |
| 2002/0078068 A1 | 6/2002 | Krishnaprasad et al. | |
| 2004/0267803 A1* | 12/2004 | Zhou et al. | 707/102 |
| 2005/0055355 A1* | 3/2005 | Murthy et al. | 707/100 |
| 2005/0229158 A1* | 10/2005 | Thusoo et al. | 717/115 |
| 2006/0074894 A1 | 4/2006 | Remahl et al. | |
| 2006/0195831 A1 | 8/2006 | Bossom et al. | |
| 2007/0156748 A1 | 7/2007 | Emam et al. | |
| 2007/0219959 A1* | 9/2007 | Kanemasa | 707/3 |

OTHER PUBLICATIONS

U.S. Office Action dated Mar. 19, 2010 for U.S. Appl. No. 11/649,004, filed Jan. 3, 2007.

\* cited by examiner

*Primary Examiner* — Charles Kim
*Assistant Examiner* — Anteneh Girma
(74) *Attorney, Agent, or Firm* — Kraguljac & Kalnay, LLC (57) ABSTRACT

Systems, methods, and other embodiments associated with providing query modes for translation-enabled XML documents are described. One method embodiment includes receiving an XPath query to an XML document that may store a translation for a data element. The method embodiment may also include automatically selecting a query mode for the XPath query. The method embodiment may also include querying the XML document using the XPath query and the selected query mode. The query mode may control, at least in part, the operation of an XML database logic.

24 Claims, 7 Drawing Sheets

QUERY MODES FOR TRANSLATION-ENABLED XML DOCUMENTS

CROSS REFERENCE TO RELATED APPLICATIONS

This application is related to the following U.S. patent application on Jan. 3, 2007, which is assigned to the present assignee: "XML-BASED TRANSLATION", Ser. No. 11/649,004 filed contemporaneously with this application, inventors: Nipun Agarwal, Sanket Malde, Bhushan Khaladkar, and Eric Sedlar.

BACKGROUND

An internationalized computer application may be configured to attempt to present information in conformance with local languages, cultures, and so on. An internationalized computer application may therefore interact with a database (s) that stores content (e.g., strings) in multiple languages. Conventionally, a relational database(s) would store this content (e.g., prompts, error messages, headings, button labels, menu items) in a set of relational database tables. In this conventional approach, the database would be loaded with entries for the entire set of languages to be supported. If no translation was available for a particular language, a meaningless translation and/or a default translation may have been stored anyway. This approach did not facilitate efficient querying.

BRIEF DESCRIPTION OF THE DRAWINGS

The accompanying drawings, which are incorporated in and constitute a part of the specification, illustrate various example systems, methods, and other embodiments of various aspects of the invention. It will be appreciated that the illustrated element boundaries (e.g., boxes, groups of boxes, or other shapes) in the figures represent one example of the boundaries. One of ordinary skill in the art will appreciate that in some embodiments one element may be designed as multiple elements, multiple elements may be designed as one element, an element shown as an internal component of another element may be implemented as an external component and vice versa, and so on. Furthermore, elements may not be drawn to scale.

DETAILED DESCRIPTION

Example systems and methods interact with systems and methods that provide an XML-based translation service. These translation systems store translations for content (e.g., strings) in schema-based XML documents that are stored in an XML-enabled database. In these systems, an XML-enabled database stores and processes XML documents using XML compliant interfaces and logics (e.g., XPath, XQuery). The translation systems provide a virtual view of stored XML documents to an internationalized application. The application may be a dynamically customizable internationalized application that provides a localized experience to a user based on a language associated with the locale and/or the user.

Elements that can be translated (e.g., elements for which there may be a translation), may be annotated with an identifier that indicates that the element may be translated. The identifier may be, for example, an XML attribute and/or a value for an XML element. Elements that are translations for an element that can be translated may also be annotated with an identifier that indicates that the element is the representation of an element in a certain language. These elements may also include an identifier that indicates the language of the stored element. The identifier may be, for example, an XML attribute that denotes the translation language (e.g., xml:lang=English). These annotations may be used (e.g., analyzed, processed) by XML interfaces, XML functions, extensions to XML interfaces, extensions to XML functions, and so on, to provide the translation services.

Storing elements that can be translated in XML documents and storing translations for those elements in XML documents facilitates leveraging XML and XMLSchema standards. Consider an application that might be used in different language environments. When a user begins interacting with the application, the user may identify a preferred language for the application. The application may then interact with an XML-based database configured to support translation-aware XML documents. These translation-aware XML documents may conform to a published XML schema that describes how to identify (e.g., annotate) elements so that they may interact with translation-capable XML logics (e.g., XPath, XQuery). The XML-based database may provide text (e.g., menu entries, button labels, error messages) to the application. The text may be selected to conform to the preferred language. For strings for which no translation is available in the preferred language, a "source language" version may be returned. The user may then supply their own translation, which may be used to update an XML document from which the source language version was retrieved. This translation-aware query and update functionality may be provided by manipulating (e.g., augmenting, extending, adapting) an XML interface (e.g., xmltype) to provide translation-enabling data (e.g., element annotations, attribute annotations, values) to logics in the XML-based database. Extending an XML interface may include, for example, adding a function to the interface that detects and processes translation specific XML items including elements, attributes, annotations, and so on.

A user and/or an application interacting with a translation enabled XML-based database may or may not be aware of whether translation services are available. Thus, example systems and methods provide query modes for translation-enabled XML documents. The query modes may include, for example, an explicit query mode and an implicit query mode. The query modes may control how a query is presented to and/or processed by an XML-enabled database. An XML-enabled database can store and process XML documents using XML compliant interfaces (e.g., xmltype) and logics (e.g., XPath, XQuery). A translation-enabled XML document may conform to a schema that defines identifiers (e.g., annotations), relationships between elements, defaulting rules, and so on.

References to "one embodiment", "an embodiment", "one example", "an example", and so on, indicate that the embodiment(s) or example(s) so described may include a particular feature, structure, characteristic, property, element, or limitation. Not every embodiment or example necessarily includes that particular feature, structure, characteristic, property, element or limitation. Furthermore, repeated use of the phrase "in one embodiment" or "in one example" does not necessarily refer to the same embodiment, though it may.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer component", as used herein, refers to a computer-related entity (e.g., hardware, firmware, software, software in execution, combinations thereof). Computer components may include, for example, a process running on a processor, a processor, an object, an executable, a thread of execution, a program, and a computer. A computer component(s) may reside within a process and/or thread. A computer component may be localized on one computer and/or may be distributed between multiple computers.

"Machine-readable medium", as used herein, refers to a medium that stores and participates in directly or indirectly providing signals, instructions and/or data that can be read by a machine (e.g., computer). A machine-readable medium may take forms, including, but not limited to, non-volatile media (e.g., optical disk, magnetic disk), and volatile media (e.g., semiconductor memory, dynamic memory). Common forms of machine-readable mediums include floppy disks, hard disks, magnetic tapes, RAM (Random Access Memory), ROM (Read Only Memory), CD-ROM (Compact Disk ROM), DVD, and so on.

In some examples, "database" is used to refer to a collection of data. In other examples, "database" may be used to refer to a set of collections of data. In still other examples, "database" may refer to a set of data stores and methods for accessing and/or manipulating those data stores.

"Data store", as used herein, refers to a physical and/or logical entity that can store data. A data store may be, for example, a table, a file, a list, a queue, a heap, a memory, a register, a disk, and so on. In different examples a data store may reside in one logical and/or physical entity and/or may be distributed between multiple logical and/or physical entities.

"Logic", as used herein, includes but is not limited to hardware, firmware, software stored on a machine-readable medium and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. In some examples, logic may be fully embodied as software stored on a machine-readable medium or in execution on a machine. Where multiple logical logics are described, it may be possible in some examples to incorporate the multiple logical logics into one physical logic. Similarly, where a single logical logic is described, it may be possible in some examples to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a natural language, a database query language, and so on.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer instructions and/or processor instructions stored on a machine-readable medium that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, threads, and/or programs. In different examples software may be embodied in separate applications and/or libraries. In different examples, software may be implemented in executable and/or loadable forms including, but not limited to, a stand-alone program, an object, a function (local and/or remote), a servlet, an applet, instructions stored in a memory, part of an operating system, and so on. In different examples, machine-readable and/or executable instructions may be located in one logic and/or distributed between multiple communicating, co-operating, and/or parallel processing logics and thus may be loaded and/or executed in serial, parallel, massively parallel and other manners.

"User", as used herein, includes but is not limited to, one or more persons, software, computers or other devices, or combinations of these.

"XML" refers to eXtensible Markup Language. XML facilitates describing data. An XML document may include elements, attributes, and tags. Tags may be user-defined. XML elements are extensible, have relationships (e.g., parent, child, sibling), have content, and can have attributes. XML attributes provide additional information about elements. In an XML document, data can be stored in attributes and/or in child elements.

"XPath", as used herein, refers to a logic, language, and/or expression for finding information in an XML document. XPath uses a syntax that relates to the logical structure of an XML document. Thus, XPath allows for the search and retrieval of information within an XML document. XPath defines a syntax for defining parts of an XML document and thus facilitates navigating through elements and attributes in an XML document. XPath uses expressions to perform this navigation. An XPath expression returns either a node set, a string, a Boolean, or a number.

XPath contains a library of standard functions and uses path expressions to select nodes or node-sets from an XML document. In example systems and methods, an XPath expression may interact, for example, with a translate( ) function in the http://xmlns.oracle.com/xdb namespace that facilitates returning a string in a translated form that agrees with a session language associated with a user and/or application. In example systems and methods, XPath may be modified to locate a translated string associated with a session language. The locating may be performed by interacting with an XML document(s) and thus without doing a table scan. The locating may involve XPath expressions that are rewritten by example systems and methods to interact with annotations of translation-aware XML elements.

"XQuery", as used herein, refers to a logic, language, and/or expression. XQuery as a language is to XML what SQL (structured query language) is to relational database tables in that XQuery queries can be written to query XML data. XQuery provides a language for finding and/or extracting elements and/or attributes from XML documents.

"XML DOM", as used herein, refers to the XML document object model (DOM). The XML DOM defines a standard way to access and/or manipulate XML documents. The XML DOM presents an XML document as a tree structure of elements having other embedded elements, where elements are referred to as nodes. The XML DOM facilitates dynamically accessing and/or updating the content, structure, and/or style of an XML document.

Some portions of the detailed descriptions that follow are presented in terms of algorithm descriptions and representations of operations on electrical and/or magnetic signals capable of being stored, transferred, combined, compared, and otherwise manipulated in hardware. These are used by those skilled in the art to convey the substance of their work to others. An algorithm is here, and generally, conceived to be a sequence of operations that produce a result. The operations may include physical manipulations of physical quantities. The manipulations may produce a transitory physical change like that in an electromagnetic transmission signal.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is to be appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

Example methods may be better appreciated with reference to flow diagrams. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent computer-executable instructions. While the figures illustrate various actions occurring in serial, it is to be appreciated that in some examples various actions could occur concurrently, substantially in parallel, and/or at substantially different points in time.

Figure 1:
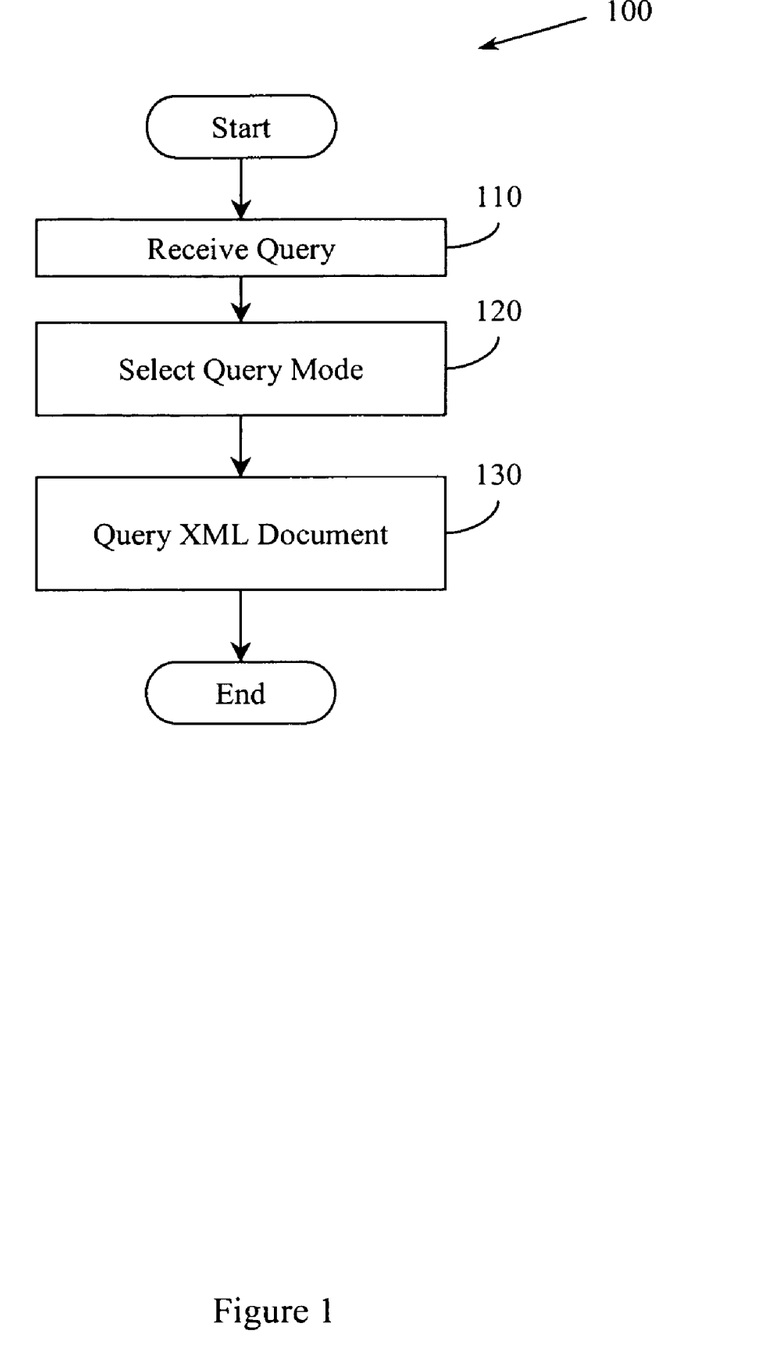
FIG. 1 illustrates an example method associated with providing query modes for translation-enabled XML documents.

FIG. 1 illustrates a method 100 associated with providing query modes for translation-enabled XML documents. Method 100 may include, at 110, receiving a query to an XML document. The XML document may store translations for data elements (e.g., text strings). The query may be, for example, an XPath query. The XPath query may include elements that are specifically designed to work with a translation-enabled XML database. For example, the XPath query may include elements for use with a ora:translate function extension to an XPath logic, elements for use with a translate function extension to an XQuery logic, and so on. However, the XPath query may not include such elements. Thus, before providing the query to a search logic, or before controlling an XML-enabled database logic to perform the query, a decision may be made concerning the query mode to be employed.

Method 100 may therefore also include, at 120, automatically selecting a query mode to query the XML document. In one example, the query mode is either an explicit query mode or an implicit query mode. In one example, the query mode may be selected based on the presence of explicit elements in the query that identify the query as being configured for and intended for a translation-enabled XML database. In another example, the query mode may be selected based, at least in part, on a property of a terminal node in an XPath associated with the XPath query. For example, if the XPath query includes no explicit identifying elements and yet the terminal node contains a translatable element determined by the XML Schema, then an implicit query mode may be selected.

Method 100 may also include, at 130, querying the XML document using the XPath query and the selected query mode. The query mode may control, at least in part, how an XML database logic(s) operates. For example, the query mode may control how an XPath logic operates, how an XQuery logic operates, and so on. This control may include, for example, controlling whether a logic looks for and processes explicit query elements, controlling whether a query is rewritten, and so on.

In one example, a method may be implemented as processor executable instructions. Thus, in one example, a machine-readable medium may store processor executable instructions that if executed by a machine (e.g., processor) cause the machine to perform method 100. While method 100 is described being stored on a machine-readable medium, it is to be appreciated that other example methods described herein (e.g., 200, 300, 400) and/or combinations thereof may also be stored on a machine-readable medium.

Figure 2:
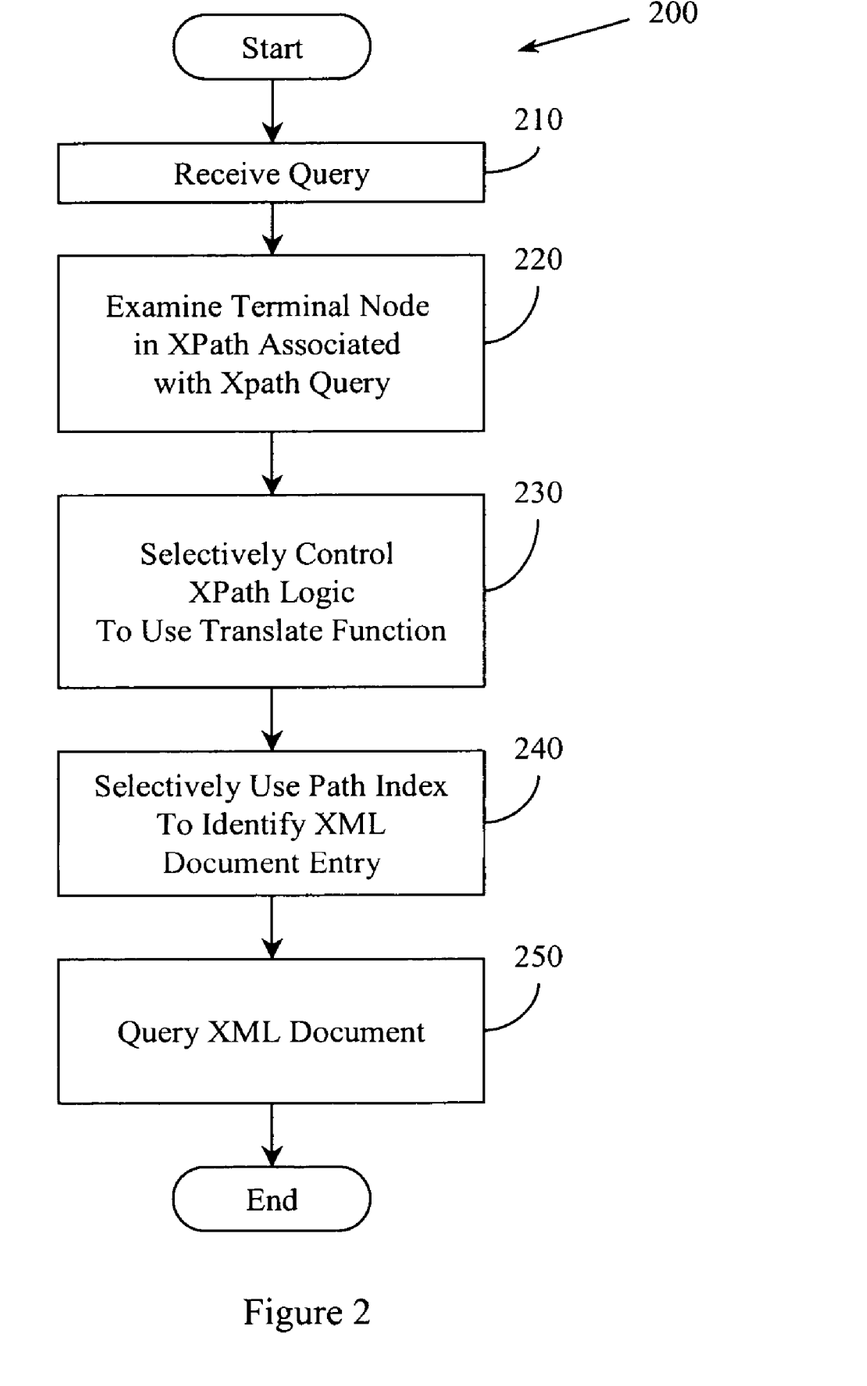
FIG. 2 illustrates an example method associated with providing query modes for translation-enabled XML documents.

FIG. 2 illustrates a method 200 associated with providing query modes for translation-enabled XML documents. Method 200 may include, at 210, receiving a query (e.g., XPath query). Method 200 may also include, at 220, examining a terminal node in an XPath associated with the XPath query. The terminal node may appear in an XML document that stores translations. The examining may include determining whether the terminal node refers to a translatable element. Therefore, automatically selecting the query mode may include determining whether a terminal node in an XPath associated with the XPath query refers to a translatable element.

Method 200 may also include, at 250, querying the XML document using the XPath query and the selected query mode. As described above, the query mode may influence how an XML database logic(s) (e.g., XPath logic) operates. For example, when using the explicit query mode a first set of actions that rely on the explicit query elements may be taken while when using the implicit query mode a second set of actions that rely on a rewritten query format may be taken. Thus, before querying the XML document at 250, method 200 may also include, at 230, controlling an XML-enabled database logic (e.g., XPath logic) to use a translate function extension to process the query. The translate function may accept a parent node list and a name of a translated child as inputs. After being provided with the inputs, the translate function may output a node list having one node for each parent in the parent node list corresponding to the translated child. A node in the node list will have a language setting. The value for the language setting may indicate that the language matches a session language associated with an application that provided the XPath query. In this case a translation is likely available in an XML document. The value for the language setting may also indicate that the language matches a source language. In this case a translation is likely unavailable in an XML document and a default may be provided. Note that the default translation may be provided using a defaulting logic rather than by providing a stored default translation. Not storing default translations for each language for which a translation is not available facilitates reducing storage space wastage and also facilitates making more efficient queries.

The controlling at 230 may occur, for example, in association with querying an XML document using the explicit query mode. In one example, an XPath logic may be controlled to use a normalized translation function that can be operatively connected to a streaming evaluation logic and/or an XML index logic. Additionally, the normalized translation function may employ a translation-enabled operator to perform matching without involving the XML document object model (DOM). Conventionally, such matching would routinely involve the XML DOM. In one example, the normalized translation function selectively employs a path index to identify an XML document entry. The path index may be used to identify an XML document entry when, for example, an XML Index associated with the XPath query is available. When the XML Index is available, the normalized translation function may construct a node identification image that corresponds to a parent XPath. After constructing the node identification image, the normalized translation function may pass the node identification image to a translation-enabled operator which will then filter on a language.

Figure 3:
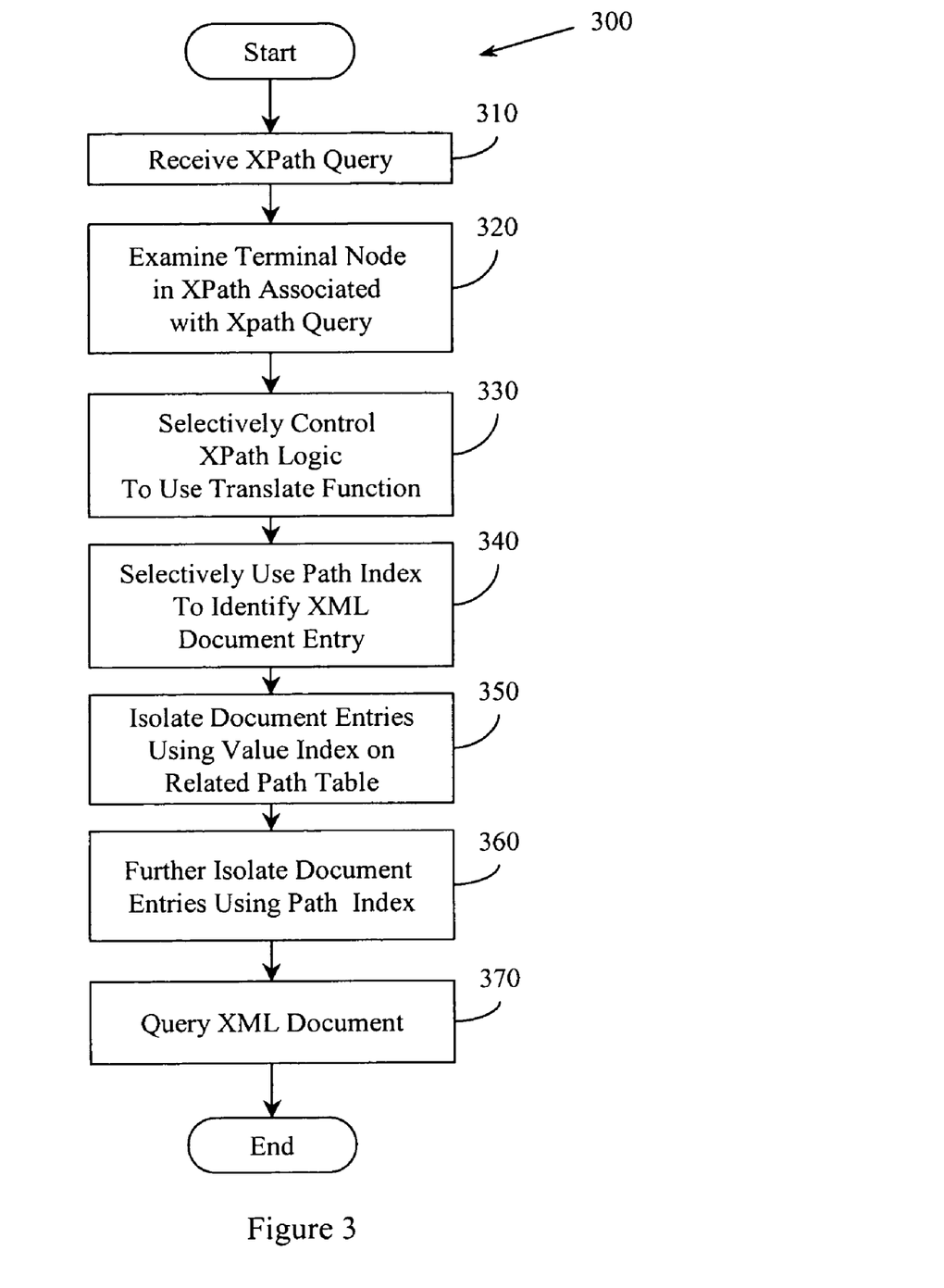
FIG. 3 illustrates an example method associated with providing query modes for translation-enabled XML documents.

FIG. 3 illustrates a method 300 associated with providing query modes for translation-enabled XML documents. Method 300 may include several actions similar to those described in connection with method 200. For example, method 300 may include receiving a query (e.g., XPath query) at 310, examining a terminal node at 320, controlling an XPath logic at 330, identifying a document entry at 340, and querying an XML document at 370. However, method 300 may also include additional actions.

For example, method 300 may include, at 350, isolating a document entry having the value of a translated child. The isolating may be performed, for example, using a value index on a related path table. The isolating may be performed after comparing a value of a translated node in an XPath predicate using the explicit query mode and determining that an XML Index is associated with the XPath query.

Method 300 may also include, at 360, further isolating document entries using, for example, a path index. This isolating may also occur upon determining that an XML Index is associated with the XPath query. The actions performed at 350 and 360 provide more efficient querying than is possible with conventional methods due, at least in part, to an interaction between explicit query mode elements and an index available for elements in an XML document in which translations are stored.

Figure 4:
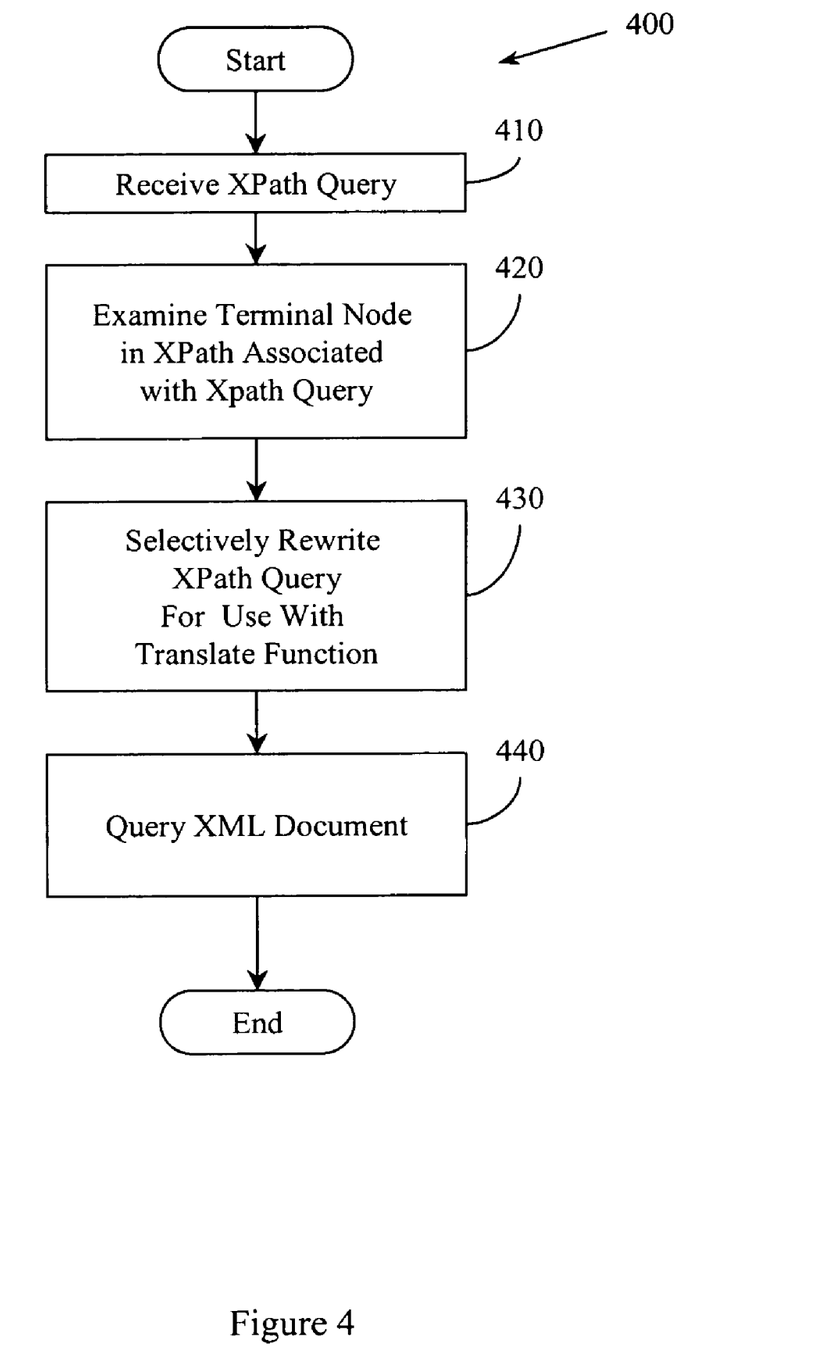
FIG. 4 illustrates an example method associated with providing query modes for translation-enabled XML documents.

FIG. 4 illustrates a method 400 associated with providing query modes for translation-enabled XML documents. Method 400 may include several actions similar to those described in connection with method 200. For example, method 400 may include receiving a query (e.g., XPath query) at 410, examining a terminal node at 420, and querying an XML document at 440. However, method 400 may also include additional actions. For example, method 400 may include, at 430, selectively rewriting the query for use by a translate function.

The rewriting at 430 may occur upon determining that a terminal node in the XPath associated with the query refers to a translatable element. In one example, the rewriting may only be applied to an XPath query that does not have a complex predicate. In another example, the rewriting may only be applied to an XPath query that does not have an axis that specifies all nodes in a path. The rewriting at 430 may facilitate interacting with different logics associated with an XML-enabled database. For example, the rewriting may include controlling an XPath normalization logic to rewrite the XPath query so that it may be executed by logics including an XML Index logic and an XML streaming evaluation logic.

Figure 5:
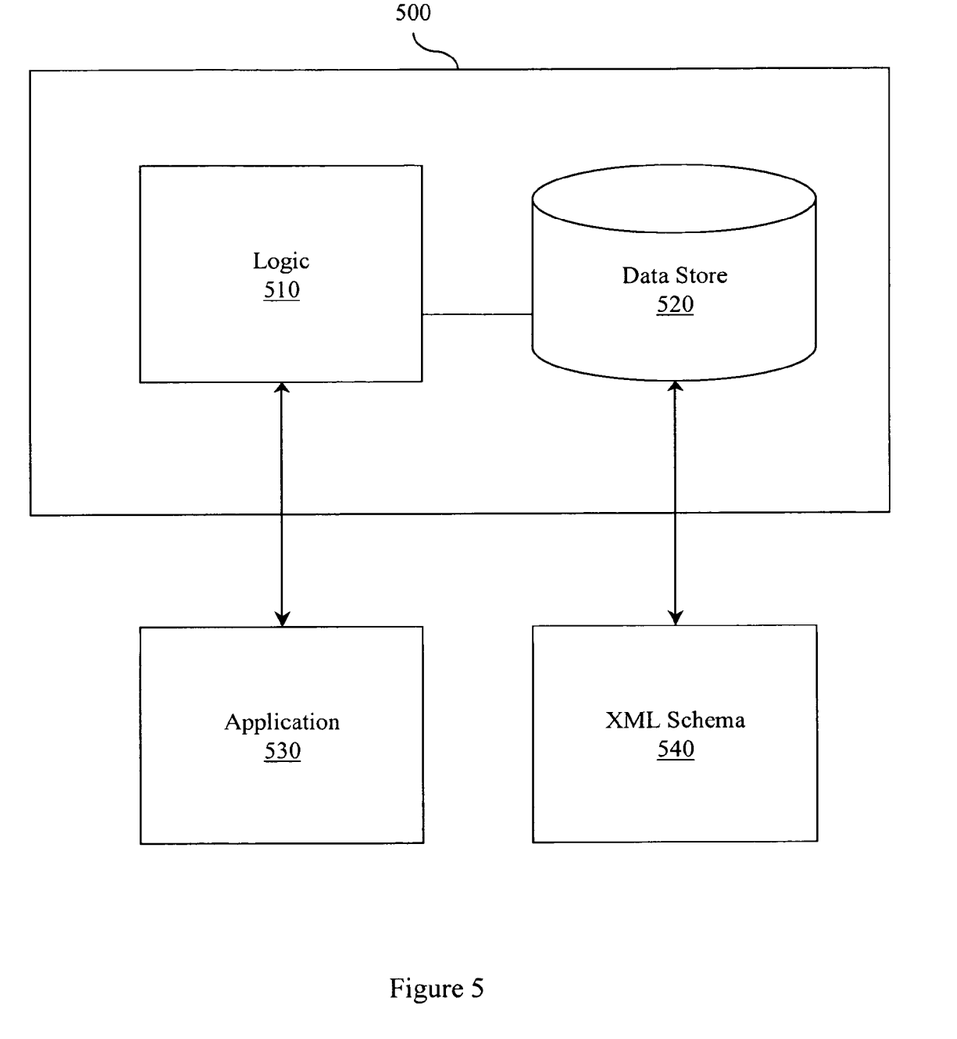
FIG. 5 illustrates an example system associated with providing query modes for translation-enabled XML documents.

FIG. 5 illustrates a system 500 that includes a logic 510 that provides query modes for a dynamically customizable application 530. The application 530 may query a translation-enabled XML document stored in a data store 520 in an attempt to retrieve localized content. In one example, the data store 520 may be part of an XML-enabled database that stores XML documents that store translations for strings useable by the application 530. The query modes between which the logic 510 may decide may include, for example, an explicit query mode and an implicit query mode. Since logics in an XML-enabled database may be configured to operate differently based on the presence or absence of explicit elements in a query, the logic 510 may be configured to selectively control a logic(s) in an XML-enabled database based on the query mode. The logics may include, for example, an XPath logic and an XQuery logic.

In one example, the translation-enabled XML document may conform to a translation-enabling XML schema 540. The schema 540 may describe how a translation-enabled XML document may include a first element that stores a first text string in a first language. The schema 540 may also describe how a translation-enabled XML document may include a second element(s) that stores a corresponding second text string that represents a translation(s) of the first string. The schema 540 may also describe how the first element may include an identifier (e.g., annotation) to identify the first element as storing a string for which a translation may be available. Similarly, the schema 540 may also describe how a second element may include an identifier (e.g., annotation) that identifies the second element as storing corresponding translation strings. Thus, the schema 540 may describe elements that can be present in a query and upon which decisions may be made concerning identifying a query mode (e.g., explicit, implicit) for a query.

Figure 6:
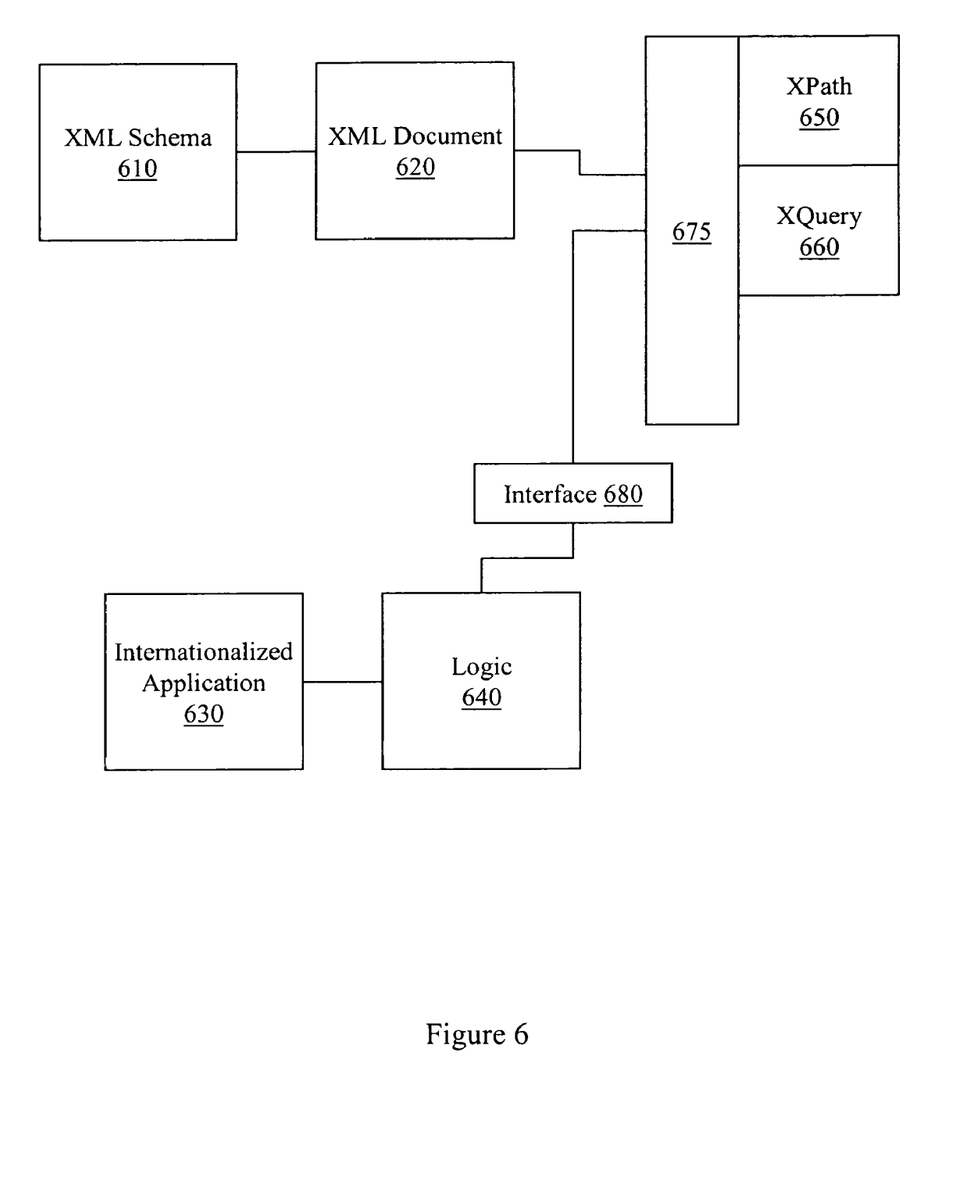
FIG. 6 illustrates an example logic associated with providing query modes for translation-enabled XML documents.

FIG. 6 illustrates a logic 640 that provides query modes for an internationalized application 630. The query modes facilitate the application 630 accessing an XML document(s) 620 that stores translations. Internationalized application 630 may seek localized content from the XML document 620. XML document 620 may conform to an XML schema 610 like that described in connection with FIG. 5. Additionally, the XML schema 610 may describe an additional identifier that identifies a default translation for a string. The language of the default translation may be defined as being the "source language" for the string.

Logic 640 may interact with an XML-enabled database through an interface 680. In one example, the interface 680 may be the xmltype interface. Interface 680 may interact with XML logics (e.g., XPath 650, XQuery 660), among others, through an extension 675 to one and/or all of these logics. In one example, the extension 675 may be a function (e.g., translate( )) configured to process queries in different modes. These queries may process translation-enabling annotations (e.g., first identifier, second identifier, third identifier) described in XML schema 610, instances of which may appear in XML document 620. Thus, in one example the logic 640 provides the query modes for application 630 by interacting through the xmltype interface 680 with an extension 675 (e.g., translate function) to an XPath logic 650, and/or an XQuery logic 660.

Figure 7:
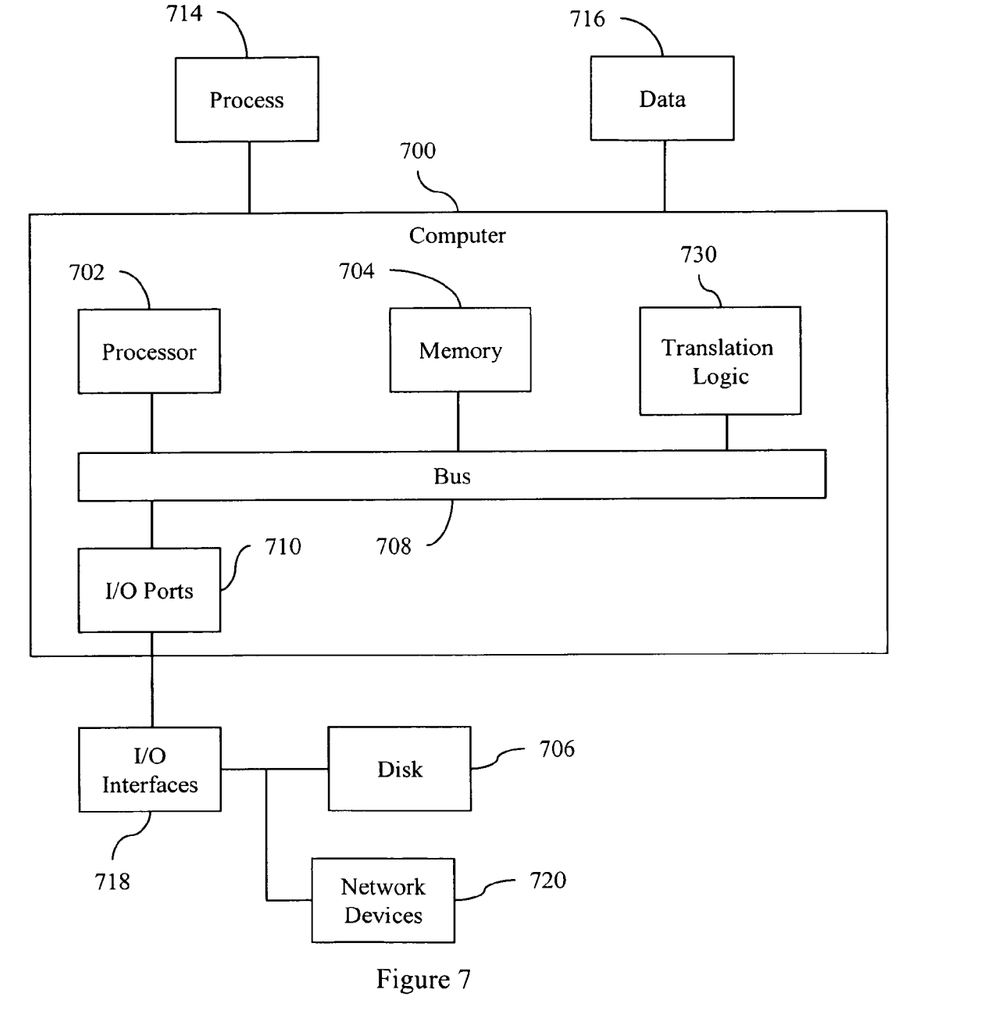
FIG. 7 illustrates an example computing environment in which example systems and methods illustrated herein may operate.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include a translation logic 730 configured to facilitate providing query modes for translation-enabled XML documents. In different examples, the logic 730 may be implemented in hardware, software, firmware, and/or combinations thereof. Thus, the logic 730 may provide means (e.g., hardware, software, firmware) for evaluating an XPath query to determine a query mode to employ with the XPath query. The evaluating may include, for example, parsing the XPath query to look for certain explicit elements, locating and examining a terminal node associated with the XPath query, and so on. The logic 730 may also include means for controlling how an XML-enabled database logic processes the XPath query based, at least in part, on the query mode. The controlling may include, for example, establishing a query mode and providing a signal(s) to a logic in an XML-enabled database to control that logic to process a query using the established query mode. While the logic 730 is illustrated as a hardware component attached to the bus 708, it is to be appreciated that in one example, the logic 730 could be implemented in the processor 702.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, and/or a memory stick. Furthermore, the disk 706 may be a CD-ROM, a CD recordable drive (CD-R drive), a CD rewriteable drive (CD-RW drive), and/or a digital video ROM drive (DVD ROM). The memory 704 can store a process 714 and/or a data 717, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, SATA, Infiniband, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a local area network (LAN), a wide area network (WAN), and other networks.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. Additionally, when the applicants intend to indicate "at least one of A, at least one of B, and at least one of C", then the phrasing "at least one of A, at least one of B, and at least one of C" will be employed.

What is claimed is:

1. A method, comprising:
   receiving a query to an XML document, where the XML document stores a translation for a data element;
   determining if the query includes identifying elements that identify the query as being configured to act on a translation-enabled database and, if the query includes identifying elements, selecting an explicit query mode that controls an XPath logic to use a normalized translation function to process the query;
   determining whether a terminal node in an XPath associated with the query refers to a translatable element, and if the terminal node in the XPath associated with the query is determined to refer to a translatable element, selecting an implicit query mode for querying the XML document, wherein the query is rewritten for use by a translate function; and
   querying the XML document using the query and the selected query mode.

2. The method of claim 1, where the query mode controls, at least in part, the operation of one or more XML-enabled database logics.

3. The method of claim 2, where the operation of an XML-enabled database logic is controlled to use the query mode and to not invoke the XML DOM.

4. The method of claim 2, the query being an XPath query, the one or more XML database logics including an XPath logic, and an XQuery logic.

5. The method of claim 1, where querying the XML document using the explicit query mode includes controlling an XPath logic to use a translate function configured to accept a parent node list and a name of a translated child as inputs.

6. The method of claim 5, the translate function being configured to output a node list having one node per parent in the parent node list, where the one node per parent corresponds to the translated child, and where the one node per parent has a language setting that matches one of, a session language, and a language of a node that matches a source language.

7. The method of claim 1, where querying the XML document using the explicit query mode includes controlling an XPath logic to use the normalized translation function, where the normalized function can be operatively connected to one or more of, a streaming evaluation logic, and an XML index logic.

8. The method of claim 7, where the normalized translation function employs a translation-enabled operator to perform matching, where the matching does not involve the XML document object model (DOM).

9. The method of claim 8, where the normalized translation function employs a path index to identify an XML document entry when an XML Index associated with the XPath query is available.

10. The method of claim 8, where the normalized translation function constructs a node identification image corresponding to a parent XPath and passes the node identification image to a translation-enabled operator for filtering on a language.

11. The method of claim 5, including:
examining a value of a translated node in an XPath predicate using the explicit query mode; and
upon determining that an XML Index is associated with the XPath query: using a value index on a related path table to isolate one or more document entries having the value of the translated node.

12. The method of claim 11, the method including:
upon determining that the XML Index is associated with the XPath query:
using a path index to further isolate the one or more document entries.

13. The method of claim 1, the method including controlling an XPath normalization logic to rewrite the XPath query so that it may be executed by one or more of, an XML Index logic, and an XML streaming evaluation logic.

14. A non-transitory computer-readable medium storing computer-executable instructions that when executed by a computer cause the computer to perform a method, the method comprising:
receiving an XPath query to an XML document that may store a translation for a data element, where the XML document conforms to a translation-enabling XML schema, where the XML document includes a first element that stores a first text string in a first language, and where the XML document includes one or more second elements that store one or more corresponding second text strings in one or more second languages, the second text strings being translations of the first text string, the first element including an identifier that identifies the first text string as storing a string for which a translation may be available, a second element including an identifier that identifies the second element as storing a corresponding translation string;
automatically selecting a query mode for querying the XML document based, at least in part, on one or more of, whether a terminal node in an XPath associated with the XPath query refers to a translatable element, and whether the XPath query includes one or more explicit query mode elements, the query mode being one of, an explicit query mode, and an implicit query mode; and
querying the XML document using the XPath query and the selected query mode, where the query mode controls, at least in part, the operation of one or more XML-enabled database logics including an XPath logic, and an XQuery logic,
where querying the XML document using the explicit query mode includes controlling the XPath logic to use a translate function that accepts a parent node list and a name of a translated child as inputs and that provides as output a node list having one node per parent in the parent node list, where the one node per parent corresponds to the translated child, and where the one node per parent has a language setting that matches one of, a session language, and a language of a node that matches a source language, and where querying the XML document using the implicit query mode includes, upon determining that the terminal node in the XPath associated with the XPath query refers to a translatable element, selectively rewriting the XPath query to use the translate function.

15. A system, comprising:
a logic, embodied as a non-transitory computer-readable medium storing computer-executable instructions, that controls selecting one query mode of two or more query modes for a dynamically customizable application that queries a translation-enabled XML document, the two or more query modes including an explicit query mode and an implicit query mode, the selecting being based, at least in part, on query elements described in a translation-enabling XML schema;
wherein the logic is configured to determine if the query elements are described in the translation-enabling XML schema and if the query elements are described in the translation-enabling schema, selecting an explicit query mode that controls an XPath logic to use a normalized translation function to process the query;
further wherein the logic is configured to determine if a terminal node in an XPath associated with the query refers to a translatable element, and if the terminal node in the XPath associated with the query is determined to refer to a translatable element, selecting an implicit query mode for querying the XML document, wherein the query is rewritten for use by a translate function; and
a data store to store the translation-enabled XML document.

16. The system of claim 15, where the translation-enabled XML document conforms to a translation-enabling XML schema, the translation-enabled XML document including a first element that stores a first text string in a first language and one or more second elements that store one or more corresponding second text strings in one or more second languages.

17. The system of claim 16, where the second text strings are translations of the first text string, where the first element includes an identifier that identifies the first text string as storing a string for which a translation may be available, and where the one or more second elements include an identifier that identifies the second elements as storing corresponding translation strings.

18. The system of claim 17, the data store being a part of an XML-enabled database.

19. The system of claim 18, the logic being configured to selectively control one or more logics in the XML-enabled database, the one or more logics including an XPath logic and an XQuery logic.

20. A non-transitory computer-readable medium storing computer-executable instructions that when executed by a computer cause the computer to perform a method, the method comprising:
    receiving a query to an XML document,
    determining if the query includes identifying elements that identify the query as being configured to act on a translation-enabled database and, if the query includes identifying elements, selecting an explicit query mode that controls an XPath logic to use a normalized translation function to process the query;
    determining whether a terminal node in an XPath associated with the query refers to a translatable element, and if the terminal node in the XPath associated with the query is determined to refer to a translatable element, selecting an implicit query mode for querying the XML document, wherein the query is rewritten for use by a translate function; and
    querying the XML document using the query and the selected query mode.

21. The non-transitory computer-readable medium of claim 20, where the query elements include a first element that corresponds to a first text string in a first language.

22. The non-transitory computer-readable medium of claim 21, where the XML document stores second text strings that are translations of the first text string, where the first element includes an identifier that identifies the first text string as a string for which a translation may be available, and where the one or more second elements include an identifier that identifies the second elements as storing corresponding translation strings.

23. The non-transitory computer-readable medium of claim 20, where the query mode controls, at least in part, the operation of one or more XML-enabled database logics.

24. The non-transitory computer-readable medium of claim 20, where the explicit query mode uses a translate function without involving an XML document object model (DOM).

* * * * *